(12) United States Patent
Campbell

(10) Patent No.: US 6,817,771 B2
(45) Date of Patent: Nov. 16, 2004

(54) CENTER BEARING TUNED ABSORBER

(75) Inventor: Craig Campbell, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 120 days.

(21) Appl. No.: 10/229,648

(22) Filed: Aug. 28, 2002

(65) Prior Publication Data

US 2004/0040777 A1 Mar. 4, 2004

(51) Int. Cl.$^7$ ............................................... F16C 19/52
(52) U.S. Cl. ...................................... 384/535; 384/536
(58) Field of Search ................................ 384/535, 536, 384/581, 582; 180/379, 380, 381; 188/380

(56) References Cited

U.S. PATENT DOCUMENTS

| | | | |
|---|---|---|---|
| 5,145,025 A | * | 9/1992 | Damian ....................... 180/381 |
| 5,205,384 A | * | 4/1993 | Heshmat ................... 188/264 B |
| 2002/0139603 A1 | * | 10/2002 | Aiken et al. ................. 180/381 |

FOREIGN PATENT DOCUMENTS

EP    000412068 A1  *  2/1991

OTHER PUBLICATIONS

Redmond, Irvin; Investigation of a New Type of Tuned Vibration Absorber for Application to Rotating Systems; Society of Experimental Mechanics; International Motor Analysis Conference; 1995; pp. 1352–1361; Nashville, Tennessee, U.S.A.

* cited by examiner

Primary Examiner—Thomas R. Hannon
(74) Attorney, Agent, or Firm—Jennifer M. Brumbaugh; Mick A. Nylander

(57) ABSTRACT

A center bearing tuned absorber assembly includes a cylindrical center bearing for supporting a rotating propeller shaft, and a tuned absorber having an inner sleeve disposed around the center bearing, and a mass-spring assembly arranged on an outer circumference of the inner sleeve. The mass-spring assembly includes a mass radially offset from, and attached to, the inner sleeve by a first damping element. The mass-spring assembly is arranged circumferentially on the inner sleeve in the direction of a first bending frequency associated with the rotating propeller shaft. The mass-spring assembly may be axially or radially offset from the center bearing.

19 Claims, 3 Drawing Sheets

US 6,817,771 B2

CENTER BEARING TUNED ABSORBER

TECHNICAL FIELD

The present invention relates to propeller shaft assemblies for motor vehicles. In particular, the invention concerns a center bearing tuned absorber support for a driveline propeller shaft assembly.

BACKGROUND OF THE INVENTION

Constant velocity fixed joints are known in various designs. Such joints are used primarily in the driveline of a motor vehicle for driving the wheels of a motor vehicle. They can be used in either propeller shafts or in side shafts. Side shafts extend from the axle drive to the driven wheels. For example, they connect the output ends of the rear axle differential with the driven wheel hubs of the wheels. Propeller shafts serve to transmit the drive from the gearbox output of the front wheel drive unit to the rear axle differential associated with the rear axle.

As far as propeller shafts are concerned, a number of different designs are used. They may comprise, for example, two joints which are arranged at the end of a shaft connecting the two joints which serve to be connected to the gearbox output in front, and to the drive input at the rear. However, it is also possible to use a driveline consisting of several portions, for example, two propeller shaft portions between which there is provided a center bearing or intermediate bearing. Normally, at the ends of the propeller shafts, i.e., towards the gearbox output and the drive input, there are arranged universal joints. It is also possible for a universal joint to be provided in the central region. A constant velocity plunging joint can also be provided in the central region.

The drive unit of the motor vehicle generates vibrations which, in prior art assemblies, are transmitted to the propeller shaft in the form of movement vibrations and structure-borne sound. Moreover, vibrations are induced from the relatively high rotational speeds of the propeller shafts themselves. In addition, changing torque values and rotational speeds constantly occur during the transmission of the rotational movement throughout the driveline assembly. Load values suddenly increasing to 10 times the nominal torque, and rotational speeds up to 10,000 revolutions per minute are not rare.

To reduce the transmission of vibration and structure-borne sound to the vehicle compartment, the intermediate or center bearing of a multi-sectional propeller shaft is typically located at a nodal point along the propeller shaft assembly. In some vehicle designs, however, it would be desirable to locate the center bearing at a location other than a propeller shaft nodal point. For example, ground clearance and floor plan contour considerations may dictate a less than optimum location for the center bearing from a noise and vibration standpoint. Accordingly, there is a need for a propeller shaft center bearing support having tuned absorption characteristics to isolate driveline vibrations and noise from the vehicle compartment.

SUMMARY OF THE INVENTION

The present invention provides a center bearing tuned absorber. The center bearing tuned absorber assembly includes a cylindrical center bearing for supporting a rotating propeller shaft, and a tuned absorber having an inner sleeve disposed around the center bearing, and a mass-spring assembly arranged on an outer circumference of the inner sleeve. The mass-spring assembly includes a mass radially offset from, and attached to, the inner sleeve by a first damping element. The mass-spring assembly is arranged circumferentially on the inner sleeve in the direction of a first bending frequency associated with the rotating propeller shaft. The mass-spring assembly may be axially or radially offset from the center bearing.

In another aspect of the invention, first and second mass-spring assemblies are arranged on an outer circumference of the inner sleeve in the direction of respective vertical and lateral first bending frequencies of the rotating propeller shaft. Each of the mass-spring assemblies include a mass radially offset from, and attached to, the inner sleeve by a first damping element. The tuned absorber further includes an outer sleeve disposed around the inner sleeve, and a second damping element between the inner and outer sleeves.

The present invention is advantageous in that the center bearing tuned absorber can be located at numerous positions along the propeller shaft of a vehicle driveline and be configured to reduce or eliminate bending vibrations within the vehicle driveline.

Other advantages of the invention will become apparent upon to one of skill in the art upon reading the following detailed description and with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
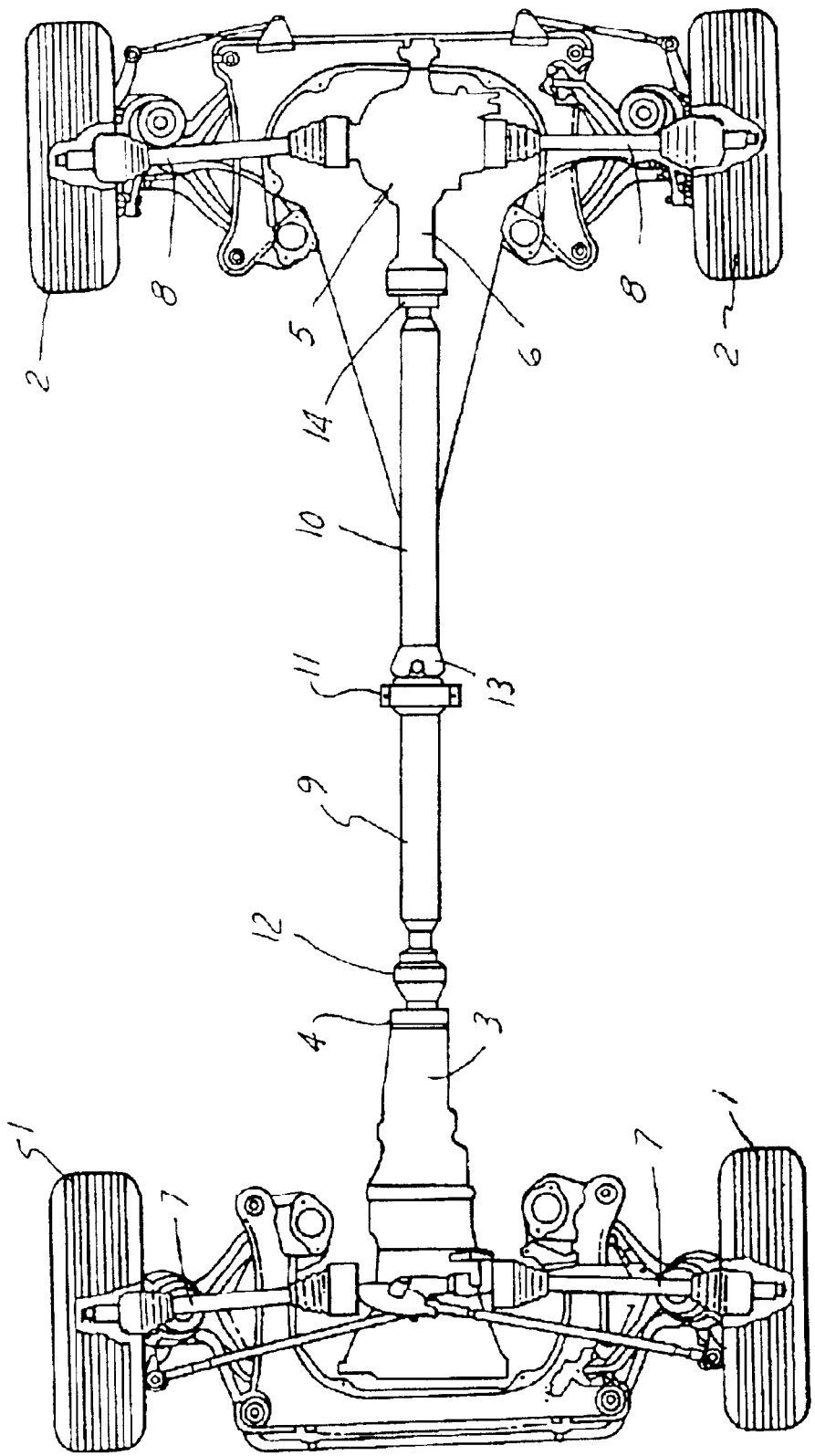
FIG. 1 is a diagrammatic illustration of a vehicle driveline having a propeller shaft assembly in which the present invention may be used to advantage.

In the following description, various operating parameters and components are described for one constructed embodiment. These specific parameters and components are included as examples and are not meant to be limiting. Referring now to the drawings wherein like reference numerals are used to identify identical components of the various views, FIG. 1 illustrates a diagrammatic view of a driveline of a motor vehicle having a propeller shaft assembly in which the center bearing tuned absorber in accordance with the present invention may be used to advantage. The driveline assembly of FIG. 1 is illustrative of the environment in which a center bearing tuned absorber in accordance with the present invention may be used. Other driveline layouts may also be improved by use of the center bearing tuned absorber disclosed herein, including single unit propeller shaft arrangements or multi-sectional propeller shaft arrangements for rear wheel drive or four-wheel drive vehicles. The center bearing tuned absorber in accordance with the present invention may also be used in side shaft assemblies.

In the example of FIG. 1, there is shown a driveline for a four-wheel drive vehicle. The two front wheels 1 and the two rear wheels 2 are driven. FIG. 1 also shows the gear box 3 with the gear box output 4. In the region of the rear axle, there is provided the axle drive 5 with the drive input 6. The two front wheels 1 are driven by side shafts 7. The two rear wheels 2 are driven by the side shafts 8, starting from the axle drive 5. The connection between the gear box 3 and the axle drive 5 is provided by a propeller shaft assembly which comprises two propeller shaft portions 9 and 10. The propeller shaft assembly is additionally supported on the floor assembly of the vehicle by an intermediate bearing 11 which, in this example, is arranged approximately centrally. In this case, the intermediate or center bearing 11 is a center bearing tuned absorber assembly in accordance with the present invention, as described in more detail below.

In the first propeller shaft portion 9, the propeller shaft assembly includes a first joint 12 in the form of a constant velocity fixed joint arranged near the gear box output 4. For connecting the two propeller shaft portions 9, 10, there is provided a second joint 13 in the form of a constant velocity fixed joint. At the end of the second propeller shaft portion 10, there is arranged a third joint 14 in the form of a constant velocity fixed joint which, via a connecting mechanism, is connected to the drive input 6 of the axle drive 5 in the region of the rear axle. In most applications, the propeller shaft portions 9, 10 rotate at a speed which is higher than the speed introduced by the engine into the manual or automatic gear box. The reduction of the speed of the rear wheels 2 takes place in the axle drive 5. Whereas, for example, the propeller shaft assembly with the propeller shaft portions 9, 10 and the associated the joints 12, 13, 14 have to rotate at speeds of up to 10,000 revolutions per minute, the speeds of the side shafts 8 for driving the rear wheels 2 reach approximately up to 2,500 revolutions per minute.

Thus, the driveline assembly of FIG. 1 is a multi-sectional propeller shaft driveline assembly including two propeller shaft portions 9, 10. The center bearing tuned absorber assembly 11 can also be used to advantage driveline assemblies having a singular propeller shaft (omitting the second joint 13), or propeller shaft assemblies having more than two propeller shaft portions.

Figure 2:
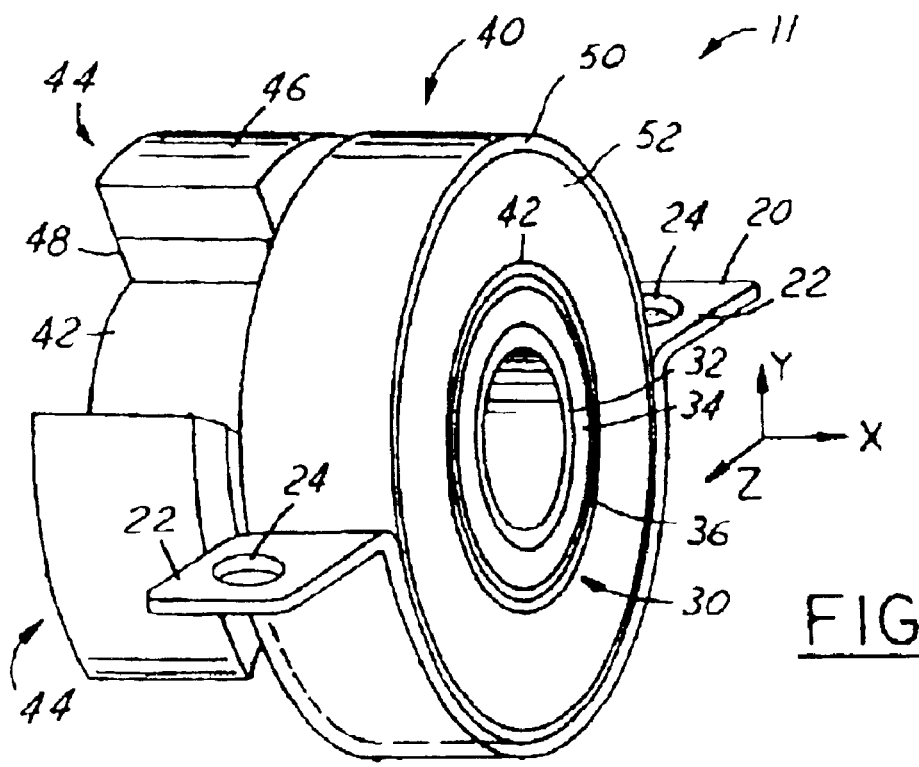
FIG. 2 is a perspective view of a center bearing tuned absorber in accordance with one embodiment of the present invention.

Referring now to FIG. 2, there is shown a perspective view of a center bearing tuned absorber assembly 11 in accordance with one embodiment of the present invention. The center bearing tuned absorber assembly 11 of FIG. 2 is shown supported by a mounting bracket 20 for fixing the center bearing 11 to the floor pan or other structural element on the underside of a vehicle. The bracket 20 includes flanges 22 on either side of the center bearing 11 which each include an opening 24 formed therein for receiving a fastener. Other configurations for bracket 20 are contemplated by the present invention and will depend upon the particular application and desired mounting location for the center bearing 11.

The center bearing tuned absorber 11 includes a center bearing 30 and a tuned absorber 40. The center bearing 30 includes an inner race 32, a bearing sleeve 34 and an outer race 36. The inner race 32 is cylindrical and forms an opening for receiving the propeller shaft portion (not shown) of the driveline assembly. The outer race 36 surrounds the inner race 32 and is also cylindrical. The bearing sleeve 34 holds in place the bearings (roller or ball) which contact the inner race 32 and outer race 36 such that the inner race 32 which supports the propeller shaft can freely rotate with respect to the outer race 36 which is rotationally fixed. Other embodiments for the center bearing 30 are also contemplated by the present invention which allow free rotation of the inner race 32 supporting the propeller shaft with respect to the rotationally fixed outer race 36 which is typically directly or indirectly affixed to the underside of the vehicle.

The tuned absorber 40 is a mass-spring system attached to the outer race 36 of the center bearing 30 by way of an inner sleeve 42. The inner sleeve 42 is cylindrical and greater in length than the center bearing. Preferably, the inner sleeve, starting at the front face of the center bearing 30, extends along the central rotational axis (X-axis) beyond the rear face center bearing 30. The inner sleeve 42 supports at least one mass and spring assembly 44 comprising a mass 46 such as a solid mass supported by a damping element 48. In the example of FIG. 2, two mass-spring assemblies 44 are arranged circumferentially around the inner sleeve 42, one generally centered in the Y-axis direction and one generally centered in the Z-axis direction.

The tuned absorber 40 also includes an outer sleeve 50 which is cylindrical in shape and which surrounds the inner sleeve 42. The outer sleeve 50 is approximately equal in length, and coaxial with the center bearing assembly 30. Between the outer sleeve 50 and the inner sleeve 42, there is a resilient damping element 52. The damping element 52 can be of the same material as the damping element 48 supporting the solid mass 46, or may comprise a different material specifically designed to absorb or dampen the vibrations expected in the region of damping element 52.

Figure 3:
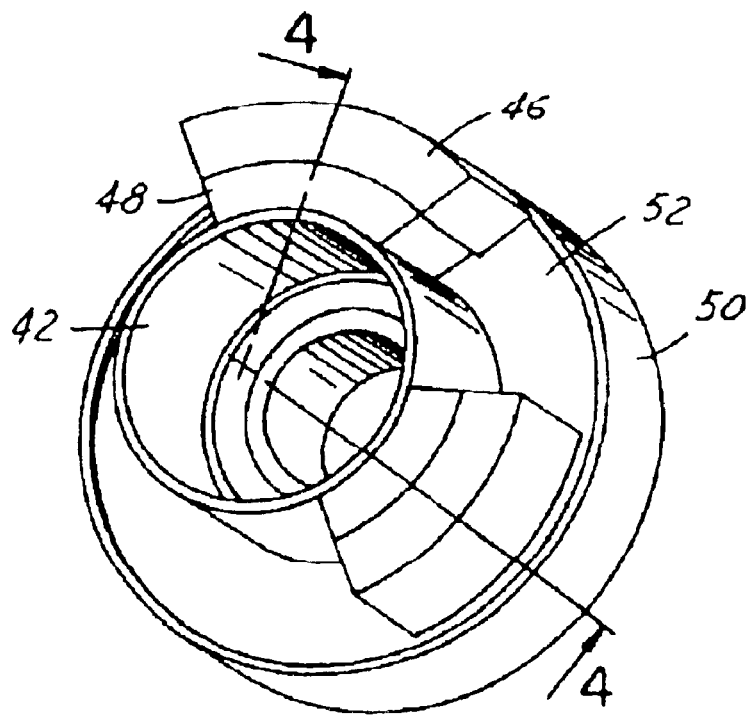
FIG. 3 is another perspective view of the center bearing tuned absorber of FIG. 1.

The damping element 48 of the mass-spring assembly 44 is, for example, a resilient polymer and comprises approximately 10% to 20% of the dynamic mass of the mass-spring assembly 44. For example, the damping element 48 has a damping property of 15% of critical or higher. The circumferential location of the mass-spring assembly 44, as well as the number of mass-spring assemblies 44 to be located on the inner sleeve is a function of the vibrational behavior of the propeller shaft segment supported by the center bearing 30. In particular, the mass-spring assemblies are tuned to the first bending frequency of the propeller shaft. Additional mass-spring assemblies are added and individually tuned to adjust for different vertical and lateral first bending frequencies. Thus, although the mass-spring assemblies 44 of FIGS. 2 and 3 are shown generally in the Y and Z-axis directions, they may be located at other locations along the circumference of the inner sleeve 42 depending upon the particular application. One, two, or three mass-spring assemblies may be required depending upon the particular dynamic characteristics of the propeller shaft. Also, the size (weight) of the mass-spring assembly 44 and, in particular, the solid mass 46 can differ for each mass-spring assembly. Again, the desired damping properties of the mass-spring assembly are directly related to the magnitude of the vibrational frequencies experienced by the propeller shaft supported by the center bearing tuned absorber assembly 11. The greater the solid mass 46, the more affect the absorber will have on splitting the resonant frequency (propeller shaft bending frequency) in the direction of its displacement. The propeller shaft bending frequency in each direction can be split and diminished independently of each other. Similarly, the damping properties of the damping element 48 can vary for the different mass-spring assemblies as dictated by the particular application under consideration.

Although the mass-spring assemblies 44 of FIGS. 2 and 3 are shown axially displaced with respect to the center bearing 30, their profile generally corresponds to the profile of the outer sleeve 50. However, they may extend radially further than the circumference of the outer sleeve 50 or radially less than the circumference of the outer sleeve 50. If packaging constraints dictate, however, the center bearing tuned absorber 11 of FIGS. 2 and 3 show one example of how the present invention may be practiced without modifying the profile of an otherwise damped center bearing. As will be discussed in more detail below with reference to FIG. 5, the mass-spring assemblies 44 can also be of numerous different shapes so long as they have mass-on-a-spring characteristics to damp the first bending frequencies experienced by the supported propeller shaft.

Figure 4:
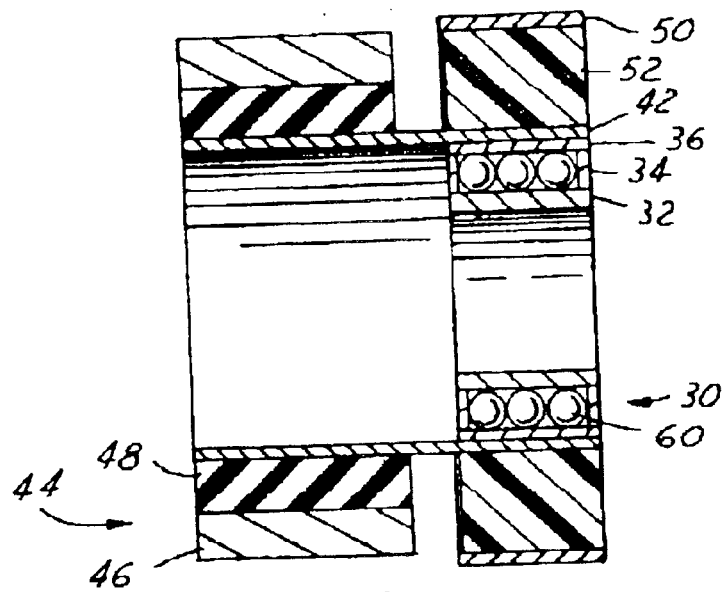
FIG. 4 is a sectional view of the center bearing tuned absorber of FIG. 3 taken along line 4—4.

Referring now to FIG. 4, there is shown a side-sectional view of the center bearing tuned absorber 11 of FIG. 3 taken along lines 4—4. As can be seen in FIG. 4, the mass-spring assemblies 44 are displaced axially with respect to the center bearing 30 in the direction of the rotational X-axis. In the example of FIG. 4, the bearings 60 between the inner race 32 and outer race 36 are shown as ball bearings although other types of bearings could also be used such as roller bearings or needle bearings.

Figure 5:
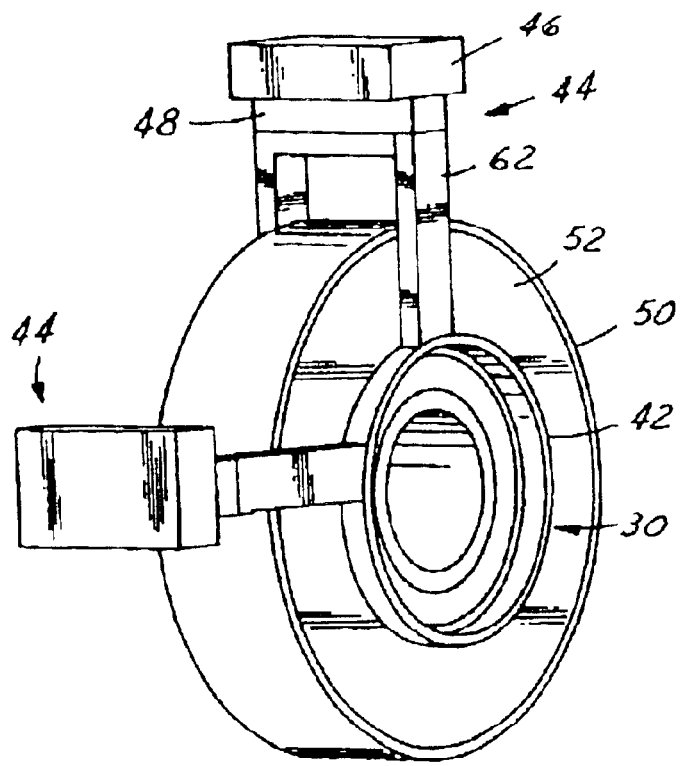
FIG. 5 is another embodiment of a center bearing tuned absorber in accordance with the present invention.

Referring now to FIG. 5, there is shown another embodiment of a center bearing tuned absorber in accordance with the present invention. In the example of FIG. 5, the center bearing 30 is surrounded by the tuned absorber assembly comprising the inner sleeve 42 to which there are attached two mass-spring assemblies 44. The center bearing tuned absorber of FIG. 5 differs from that of FIGS. 2–4 in that the mass-spring assemblies 44 are displaced radially with respect to the center bearing 30 instead of being displaced axially. A support member 62 connects the damping element 48 and solid mass 46 to the inner sleeve 42. The support 62 can be rigid such as steel or aluminium, or be comprised of a resilient polymer either the same or different of that of the damping element 48.

Combinations of axially and radially displaced mass-spring assemblies are also contemplated by the present invention. Thus, for example, a mass-spring assembly in the Y-axis direction may be displaced radially with respect to the center bearing 30 while the mass-spring assembly associated with the Z-axis may be displaced axially along the X-axis with respect to the center bearing 30.

In another embodiment, the mass-spring assemblies 44 of FIGS. 2 and 3 may also include support members such as support members 62 of FIG. 5 to extend the mass-spring assembly 44 radially with respect to the center rotational axis (X-axis).

In operation, the center bearing tuned absorber 11 of the present invention is configured to absorb or damp the first bending frequency of the propeller shaft supported by the assembly to eliminate transmission of the vertical and lateral first bending frequencies to the vehicle body structure.

From the foregoing, it can be seen that there has been brought to the art a new and improved center bearing tuned absorber which has advantages over prior center bearing support assemblies. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A center bearing tuned absorber assembly comprising:
    a cylindrical center bearing for supporting a rotating propeller shaft; and
    a tuned absorber comprising an inner sleeve disposed around said center bearing, and two mass-spring assemblies arranged on an outer circumference of said inner sleeve, one arranged circumferentially to absorb a vertical first bending frequency associated with said rotating propeller shaft and one arranged circumferentially to absorb a lateral first bending frequency of said rotating propeller shaft, said mass-spring assemblies comprising a mass radially offset from, and attached to, said inner sleeve by a first damping element.

2. The assembly of claim 1 wherein said mass-spring assembly is axially offset with respect to said center bearing.

3. The assembly of claim 1 wherein said tuned absorber further comprises an outer sleeve disposed around said inner sleeve, and a second damping element between said inner and outer sleeves.

4. The assembly of claim 3 wherein said outer sleeve is cylindrical and approximately equal in length to said center bearing, and said inner sleeve is greater in length than said center bearing and extends axially from a front face of said center bearing beyond a rear face of said center bearing.

5. The assembly of claim 3 comprising a support bracket arranged around said outer sleeve for mounting said assembly to an underside of a vehicle.

6. The assembly of claim 1 wherein said center bearing comprises an inner race, an outer race; a bearing sleeve and a plurality of bearing arranged between said inner and outer sleeves and held in place by said bearing sleeve.

7. A center bearing tuned absorber assembly comprising:
    a cylindrical center bearing for supporting a rotating propeller shaft; and
    a tuned absorber comprising an inner sleeve disposed around said center bearing, and a mass-spring assembly arranged on an outer circumference of said inner sleeve, said mass-spring assembly comprising a mass radially offset from, and attached to, said inner sleeve by a first damping element, said mass-spring assembly is radially offset with respect to said center bearing.

8. The assembly of claim 7 wherein said mass-spring assembly is radially offset from said center bearing by a support connecting said first damping element to said inner sleeve.

9. The assembly of claim 7 wherein said mass-spring assembly is arranged at a location on said outer circumference corresponding to a first bending frequency of said rotating propeller shaft.

10. A center bearing tuned absorber assembly comprising:
    a center bearing for supporting a rotating propeller shaft; and
    a tuned absorber comprising an inner sleeve disposed around said center bearing, and first and second mass-spring assemblies arranged on an outer circumference of said inner sleeve in the direction of respective vertical and lateral first bending frequencies of said rotating propeller shaft, each of said mass-spring assemblies comprising a mass radially offset from, and attached to, said inner sleeve by a first damping element, said tuned absorber further comprising an outer sleeve disposed around said inner sleeve, and a second damping element between said inner and outer sleeves.

11. The assembly of claim 10 wherein said first and second mass-spring assemblies are axially offset with respect to said center bearing.

12. The assembly of claim 10 wherein said first and second mass-spring assemblies are radially offset with respect to said center bearing.

13. The assembly of claim 12 wherein said first and second mass-spring assemblies are radially offset from said center bearing by respective supports connecting said first damping element to said inner sleeve.

14. The assembly of claim 10 wherein said respective mass of said first and second mass-spring assemblies are of different weight.

15. The assembly of claim 14 wherein the respective first damping element of said first and second mass-spring assemblies have different damping properties.

16. The assembly of claim 10 wherein the respective first damping element of said first and second mass-spring assemblies have different damping properties.

17. The assembly of claim 10 wherein said first and second damping elements have different damping properties.

18. The assembly of claim 10 wherein said center bearing, inner sleeve and outer sleeve are all cylindrical, and wherein said outer sleeve and said center bearing are approximately equal in length.

19. The assembly of claim 10 comprising a support bracket arranged around said outer sleeve for mounting said assembly to an underside of a vehicle.

* * * * *